United States Patent [19]
Denda et al.

[11] Patent Number: 6,048,473
[45] Date of Patent: Apr. 11, 2000

[54] PROCESS FOR OPERATING A SYSTEM FOR THE WATER VAPOR REFORMING OF METHANOL

[75] Inventors: Michael Denda, Senden; Christian Duelk, Ulm; Robert Gerberich, Blaustein; Norbert Wiesheu, Guenzburg, all of Germany

[73] Assignee: DaimlerChrysler AG, Germany

[21] Appl. No.: 08/876,537

[22] Filed: Jun. 16, 1997

[30] Foreign Application Priority Data

Jun. 15, 1996 [DE] Germany .................. 196 23 937

[51] Int. Cl.⁷ .................. C06D 1/02; C07C 1/02; C01B 3/02; C01B 31/18
[52] U.S. Cl. .................. 252/376; 252/373; 423/648.1; 423/418.2; 429/13
[58] Field of Search .................. 252/373, 376; 423/648.1, 418.2; 429/13

[56] References Cited

U.S. PATENT DOCUMENTS

| | | |
|---|---|---|
| 3,585,078 | 6/1971 | Sederquist et al. . |
| 5,401,589 | 3/1995 | Palmer et al. .............................. 429/13 |
| 5,712,052 | 1/1998 | Kawatsu .................................... 429/13 |

FOREIGN PATENT DOCUMENTS

| | | |
|---|---|---|
| 0 710 835A2 | of 1995 | European Pat. Off. . |
| 0 813 262A2 | of 1997 | European Pat. Off. . |
| 0 813 263A2 | of 1997 | European Pat. Off. . |
| 1949184 | 5/1970 | Germany . |
| 2157722 | 7/1972 | Germany . |
| 25 12 363A1 | of 1976 | Germany . |
| 58018881 | of 1983 | Japan . |
| 61-291402 | 12/1986 | Japan . |
| 62-46902 | 2/1987 | Japan . |
| 07320763 | of 1995 | Japan . |

*Primary Examiner*—Paul J. Killos
*Assistant Examiner*—J. Parsa
*Attorney, Agent, or Firm*—Evenson, McKeown, Edwards & Lenahan, P.L.L.C.

[57] ABSTRACT

A process for operating a system for water vapor reforming of methanol includes a mixture preparation step for preparing a water vapor/methanol mixture from water and methanol, which mixture is subsequently introduced into a reforming reactor in a quantity which depends on the load condition of the system. According to the invention, the water vapor/methanol mixture ratio of the water vapor/methanol mixture introduced into the reforming reactor is maintained at a predeterminable desired value unaffected by short-term load changing operations, to avoid undesirable short-term increases of the CO-concentration in the reformate.

8 Claims, 1 Drawing Sheet

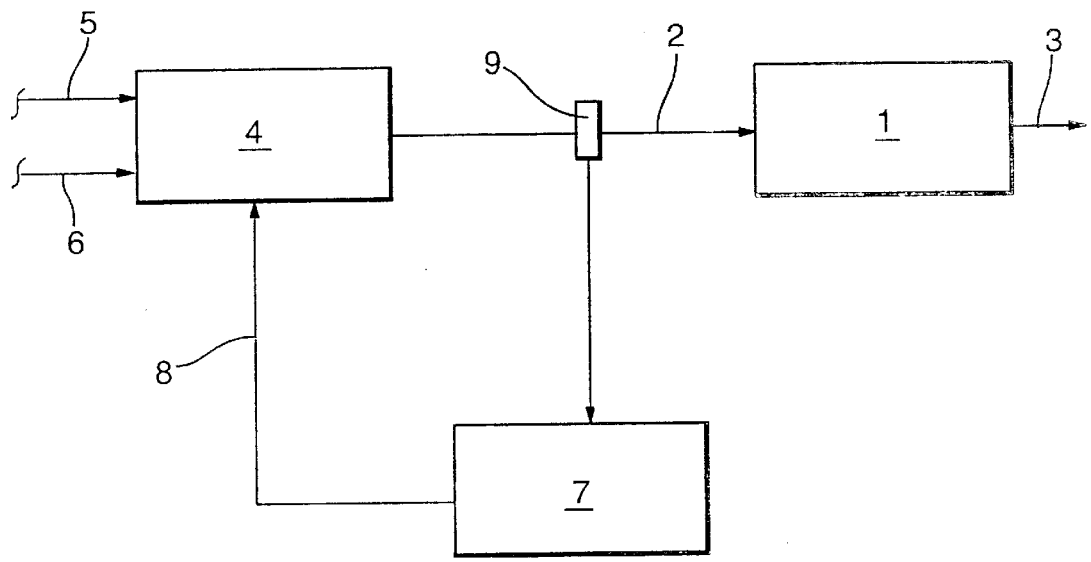

6,048,473

PROCESS FOR OPERATING A SYSTEM FOR THE WATER VAPOR REFORMING OF METHANOL

This application claims the priority of German patent application 196 23 937.0, the disclosure of which is expressly incorporated by reference herein.

BACKGROUND AND SUMMARY OF THE INVENTION

The invention relates to a process for operating a system for the water vapor reforming of methanol. Mobile systems for water vapor reforming of methanol of the generic type are operated, for example, in fuel-cell-operated motor vehicles in order to obtain hydrogen for the feeding of the fuel cells. For operating such systems, it is known to vary the amount of the processed water vapor/methanol mixture which is introduced into the reforming reactor as a function of the load condition of the system. In German Patent Documents DE 1 949 184 and DE 21 57 722 C2 (in which methane is used instead of methanol), for example, a jet pump is provided for this purpose, and the vapor flow is adjusted as a function of the loading condition of the system. Thus, during a load change, the methane inflow also changes corresponding to the jet pump characteristics.

U.S. Pat. No. 5,401,589 discloses a process for operating a fuel cell system in a motor vehicle by means of a reformer system which is connected in front of the fuel cells and uses water vapor reforming of methanol for the purpose of obtaining the hydrogen required for the fuel cells. In order to be able to react to load changes faster than by merely changing the quantity of the water vapor/methanol mixture introduced into the reforming reactor, a buffer battery and an oxygen reservoir are provided. In the case of an increased load requirement, additional oxygen is taken from the oxygen reservoir for introduction into the fuel cell system. It is also known from this as well as other documents that, when the water vapor concentration in the water vapor/methanol gas mixture is too low, during its reforming an increased CO-concentration occurs in the reformate. This is undesirable, particularly when the reformate is used as a fuel in so-called PEM fuel cells because these are poisoned by carbon monoxide. Normally, the water vapor/methanol mixing ratio is therefore maintained within a range of between one and ten.

Japanese Patent Document JP 62-46902 (A) discloses an evaporator for a methanol reforming system which contains a coil-shaped evaporator tube whose diameter increases in steps from an upper area, which is adjacent to a burner, to a lower area, to take into account the increase in volume of the medium guided through the evaporator during the heating-up of the burner. This arrangement prevents an increase in the flow speed of the medium through the evaporator tube as the heating increases, so that the water/methanol mixture guided through the evaporator retains the capacity to absorb a sufficient amount of heat, thereby preventing undesirable reliquefying effects which would otherwise occur, particularly in the case of high supply quantities in the output-side lower portion of the evaporator tube, because of an excessive flow rate.

During the operation of systems for the water vapor reforming of methanol, it is observed that in the case of a load change (that is, a change of the quantity of water vapor/methanol mixture introduced into the reforming reactor), a change of the water vapor/methanol mixture ratio occurs, due to a momentary change of the evaporation conditions in the system. This, in turn, leads to fluctuations in the CO-concentration of the reformate, which can cause undesirably high CO-concentrations at times, which must be removed in an oxidizer which follows.

The object of the invention is to provide a process of the initially mentioned type which avoids the formation of undesirably high CO-concentrations in the reformate, particularly in the case of fast load changes.

This and other objects and advantages are achieved by the process according to the invention, in which the water vapor/methanol mixing ratio of the water vapor/methanol mixture introduced into the reforming reactor is maintained at a predeterminable desired value even during load changing operations, including sudden load jumps. As a result, during the operation of the system for the water vapor reforming of methanol, no undesirably high CO-concentrations occur in the reformate; that is, neither in the static nor in the dynamic load operation. The momentary water vapor/methanol mixing ratio can be detected in a conventional manner, either directly by means of a sensor system arranged in front of the reforming reactor input, or indirectly by measuring the CO-concentration in the reformate. Corresponding measures in the mixture preparation step ensure that the predetermined desired value of the mixing ratio will then be maintained. In particular, according to the process, excessive lowering of the water vapor/methanol mixing ratio below the predeterminable desired value, which is typically between one and three (and thus an excessive CO-concentration in the reformate) can be avoided.

In one embodiment of the invention, the predetermined desired value of the mixing ratio is maintained by injecting water and methanol by way of a valve, in a timed manner during the preparation step. The injection start and/or the injection duration of the valves can be appropriately changed as a function of the deviation of the actual value of the water vapor/methanol mixing ratio from the desired value.

In another embodiment, the predeterminable desired value of the mixing ratio is maintained during sudden load jumps by storing the prepared water vapor/methanol mixture in a pressure vessel at a constant pressure and a constant temperature. From there it is supplied at a constant water vapor/methanol mixing ratio to a superheater connected in front of the reforming reactor.

Other objects, advantages and novel features of the present invention will become apparent from the following detailed description of the invention when considered in conjunction with the accompanying drawings.

BRIEF DESCRIPTION OF THE DRAWINGS

The single figure is a block diagram of a system for the water vapor reforming of methanol according to the invention.

DETAILED DESCRIPTION OF THE DRAWINGS

The system shown in FIG. 1 has a conventional reforming reactor 1 to which a water vapor/methanol mixture is supplied, to be reformed to produce a reformate 3 supplied at the reactor output, which contains the desired hydrogen and low amounts of carbon monoxide. In a step which follows (not shown), the latter is converted into carbon dioxide or separated from the hydrogen. In a mobile application, the reforming system can be used in a fuel-cell-operated motor vehicle in order to generate the hydrogen required to operate the fuel cells. The loading condition of the system is expressed in the demand for reformate emerging from the reforming reactor.

The water vapor/methanol mixture introduced into the reforming reactor 1 is prepared in a mixture preparation step 4 within which methanol fed by a methanol feed pipe 5 is mixed with water introduced by a water feed pipe 6, and is heated (that is, evaporated). The sequence of mixing on the one hand, and heating on the other, is arbitrary. A control or regulating unit 7 controls the system operation in a conventional manner, which is not shown in detail and does not have to be explained here in detail. Among others, it also controls the components of the mixture preparation step 4 for this purpose by way of a set of control lines 8.

In the illustrated system the components of the mixture preparation step 4 are controlled by the controlling or regulating unit 7 such that the water vapor/methanol mixing ratio of the water vapor/methanol mixture 2 introduced into the reforming reactor 1 is maintained at an intended predeterminable desired value, not only in static system operation but also in dynamic system operation, with fast load changes. For this purpose, by way of a corresponding sensor system 9, the control or regulating unit 7 continuously senses the momentary water vapor/methanol mixing ratio of the water vapor/methanol mixture 2 fed to the reforming reactor 1. Instead of such direct sensing of the water vapor/methanol mixing ratio, an indirect sensing by a continuous measuring of the CO-concentration in the reformate 3 is if course also possible. In the case of a determined deviation of the actual value of the mixing ratio from the predetermined desired value, the control or regulating unit 7 will then adjust the mixture preparation, in the direction of eliminating this deviation. This can take place by different methods of controlling the mixture preparation step 4 which is in each case constructed corresponding to the purpose. The desired value itself can be predetermined as a constant, or as a slowly variable function which depends on the system load.

In a first process, mixing ratio deviations from the predetermined desired value are eliminated by targeted changes of the delivered quantities of methanol and water introduced into the mixture preparation step 4. For this purpose, the mixture preparation step 4 contains one injection valve respectively for each of the methanol feed pipe 5 and the water feed pipe 6, and the delivered quantity is varied by suitable variation of the injection start, or by providing different injection valve opening times for the respective valves.

Another possibility for balancing a water depletion of the water vapor/methanol mixture 2 during a fast load change consists of a targeted injection of water into the vapor phase within the mixture preparation step 4.

Furthermore, the mixture preparation step 4 may have its own evaporator for the separate evaporation of methanol and water, with a common superheater step connected behind it. By means of this approach, mutual influencing of the evaporation processes is minimized, keeping fluctuations of the water vapor/methanol mixing ratio during load changes very low.

Another possibility for achieving a mixture preparation step 4 which is suitable for maintaining a predeterminable desired value of the mixing ratio, consists of providing a tank in which the mixture constituents are premixed in a liquid form, and are then fed to an evaporator step or superheater step by way of a common injection valve.

In addition, the mixing ratio of water vapor to methanol in dynamic system operation (load changing operations) can be maintained at a predeterminable desired value by providing a pressure vessel 4 in the mixture preparation step 4. The mixture constituents are then fed to the pressure vessel, where they are maintained at the desired temperature at a constant pressure. From this pressure vessel, the water vapor/methanol mixture can then be fed as wet water vapor at a water vapor/methanol mixing ratio maintained at the desired value to a subsequent superheater step.

By means of the described measures, systems for the water vapor reforming of methanol can therefore be operated so that dynamic changes of the water vapor/methanol mixing ratio can be abated by corresponding temporary changes of the mixture preparation. As a result, short-term fluctuations of the water vapor/methanol mixing ratio and thus undesirable short-term increases of the CO-concentration in the reformate can be reliably avoided.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for operating a reforming system for water vapor reforming of methanol, said process comprising the steps of:
   preparing a water vapor/methanol mixture from water and methanol in a mixture preparation step;
   introducing the prepared water vapor/methanol mixture into a reforming reactor in a quantity depending on a load condition of the system;
   detecting a CO content of a reformate gas output from said reforming system; and
   regulating a water vapor/methanol mixing ratio of the water vapor/methanol mixture introduced into the reforming reactor in response to detected CO content of said reformate gas, to maintain a predeterminable desired value, unaffected by short-term load changes.

2. Process according to claim 1, wherein in the step of preparing a water vapor/methanol mixture, water and methanol are injected in a timed manner by way of respective valves, at least one of a starting time and a duration of the injection being variable as a function of a deviation of an actual value of the water vapor/methanol mixing ratio from the desired value.

3. Process according to claim 1 wherein in the mixture preparation step, water and methanol are supplied to a pressure vessel and are stored at a constant pressure at a suitable temperature, and from there are supplied to a superheater step as a wet vapor mixture at a water vapor/methanol mixing ratio maintained at the predetermined desired value.

4. Process for operating a system for water vapor reforming of methanol, comprising the steps of:
   preparing a water vapor/methanol mixture in a mixture preparation step;
   reforming the water vapor/methanol mixture in a reforming reactor;
   detecting a water vapor/methanol mixing ratio of said water vapor/methanol mixture by measuring a CO content of a reformate gas which is output from said system;
   determining a deviation of said mixing ratio from a predetermined desired value; and
   adjusting mixing parameters of said mixture preparation step to abate said deviation.

5. The process according to claim 1 wherein the step of preparing a water vapor/methanol mixture includes a targeted injection of additional water vapor into said water vapor/methanol mixture, an amount of said additional water vapor being controlled to maintain said desired value of said mixing ratio.

6. Process for operating a system for water vapor reforming of methanol, said process comprising the steps of:

preparing a water vapor/methanol mixture from water and methanol in a mixture preparation step;

introducing the prepared water vapor/methanol mixture into a reforming reactor in a quantity depending on a load condition of the system; and regulating a water vapor/methanol mixing ratio of the water vapor/methanol mixture introduced into the reforming reactor to maintain a predeterminable desired value, unaffected by short-term load changes;

wherein in the step of preparing a water vapor/methanol mixture, water and methanol are injected in a timed manner by way of respective valves, at least one of a starting time and a duration of the injection being variable as a function of a deviation of an actual value of the water vapor/methanol mixing ratio from the desired value.

7. Process for operating a system for water vapor reforming of methanol, said process comprising the steps of:

preparing a water vapor/methanol mixture from water and methanol in a mixture preparation step;

introducing the prepared water vapor/methanol mixture into a reforming reactor in a quantity depending on a load condition of the system; and regulating a water vapor/methanol mixing ratio of the water vapor/methanol mixture introduced into the reforming reactor to maintain a predeterminable desired value, unaffected by short-term load changes;

wherein in the step of preparing a water vapor/methanol mixture, water and methanol are supplied to a pressure vessel and are stored at a constant pressure at a suitable temperature, and from there are supplied to a superheated step as a wet vapor mixture at a water vapor/methanol mixing ratio maintained at the predetermined desired value.

8. Process for operating a system for water vapor reforming of methanol, said process comprising the steps of:

preparing a water vapor/methanol mixture from water and methanol in a mixture preparation step;

introducing the prepared water vapor/methanol mixture into a reforming reactor in a quantity depending on a load condition of the system; and regulating a water vapor/methanol mixing ratio of the water vapor/methanol mixture introduced into the reforming reactor to maintain a predeterminable desired value, unaffected by short-term load changes;

wherein the step of preparing a water vapor/methanol mixture includes a targeted injection of additional water vapor into said water vapor/methanol mixture, an amount of said additional water vapor being controlled to maintain said desired value of said mixing ratio.

* * * * *